(12) United States Patent
Zhu et al.

(10) Patent No.: US 8,811,324 B2
(45) Date of Patent: Aug. 19, 2014

(54) POWER CONTROL METHOD, BASE STATION AND TERMINAL FOR PHYSICAL UPLINK CONTROL CHANNEL

(75) Inventors: Peng Zhu, Shenzhen (CN); Peng Hao, Shenzhen (CN); Chunli Liang, Shenzhen (CN); Bin Yu, Shenzhen (CN); Weiwei Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 106 days.

(21) Appl. No.: 13/513,088

(22) PCT Filed: Jun. 30, 2010

(86) PCT No.: PCT/CN2010/074787
§ 371 (c)(1),
(2), (4) Date: May 31, 2012

(87) PCT Pub. No.: WO2011/079611
PCT Pub. Date: Jul. 7, 2011

(65) Prior Publication Data
US 2012/0236767 A1    Sep. 20, 2012

(30) Foreign Application Priority Data
Dec. 28, 2009   (CN) .......................... 2009 1 0262770

(51) Int. Cl.
*H04W 72/04* (2009.01)
*H04W 52/04* (2009.01)
*H04W 52/34* (2009.01)
*H04W 52/32* (2009.01)
*H04W 52/14* (2009.01)
*H04W 52/42* (2009.01)
*H04W 52/54* (2009.01)

(52) U.S. Cl.
CPC .......... *H04W 52/325* (2013.01); *H04W 52/146* (2013.01); *H04W 52/34* (2013.01); *H04W 52/42* (2013.01); *H04W 52/54* (2013.01)
USPC ............ 370/329; 370/328; 370/280; 455/450

(58) Field of Classification Search
USPC .................. 370/280, 329; 455/450, 509–513
See application file for complete search history.

(56) References Cited

U.S. PATENT DOCUMENTS 6,993,342 B2 *  1/2006  Kuchibhotla et al. .......... 455/450
8,467,352 B2 *  6/2013  Hu et al. ........................ 370/335
(Continued)

FOREIGN PATENT DOCUMENTS

| CN | 101247147 A | 8/2008 |
|---|---|---|
| CN | 101404527 A | 4/2009 |
| CN | 101594683 A | 12/2009 |
| CN | 101662833 A | 3/2010 |
| CN | 101702823 A | 5/2010 |
| CN | 101720122 A | 6/2010 |

OTHER PUBLICATIONS

International Search Report for PCT/CN2010/074787.

*Primary Examiner* — Edan Orgad
*Assistant Examiner* — Emmanuel Maglo
(74) *Attorney, Agent, or Firm* — McClure, Qualey & Rodack, LLP (57) ABSTRACT

A power control method for a Physical Uplink Control Channel, which includes: when the response information of multiple Physical Downlink Shared Channels (PDSCH) sent by a base station over multiple component carriers is sent on one Physical Uplink Control Channel (PUCCH), the base station indicating a unified transmitted power control command for the Physical Uplink Control Channel; or the base station indicating multiple transmitted power control commands for the Physical Uplink Control Channel. The present invention also provides a base station and a user equipment.

17 Claims, 3 Drawing Sheets

(56) References Cited

U.S. PATENT DOCUMENTS

| | | | |
|---|---|---|---|
| 2006/0098568 A1* | 5/2006 | Oh et al. | 370/206 |
| 2010/0202414 A1* | 8/2010 | Malladi et al. | 370/335 |
| 2011/0038295 A1* | 2/2011 | Hu et al. | 370/311 |
| 2011/0111785 A1* | 5/2011 | Lindoff et al. | 455/513 |
| 2011/0243087 A1* | 10/2011 | Ahn et al. | 370/329 |
| 2012/0208583 A1* | 8/2012 | Chung et al. | 455/509 |

\* cited by examiner

POWER CONTROL METHOD, BASE STATION AND TERMINAL FOR PHYSICAL UPLINK CONTROL CHANNEL

CROSS REFERENCE RELATED APPLICATIONS

This application is a national phase of PCT/CN2010/074787 filed Jun. 30, 2010, which claims priority to China Application Serial No. 200910262770.2, filed Dec. 28, 2009, both of which are entirely incorporated herein by reference.

TECHNICAL FIELD

The present invention relates to the field of mobile communication, and more especially, to a power control method, a base station and a user equipment for a physical uplink control channel.

BACKGROUND OF THE RELATED ART

In the 3rd Generation Partnership Project Long Term Evolution (3GPP LTE) system, uplink power control (called as power control for short) is used to control transmitted power of an uplink physical channel, to compensate path loss and shadow of the channel and suppress interference between cells. Wherein, the uplink physical channel controlled by the uplink power control includes Physical Uplink Shared Channel (PUSCH), Physical Uplink Control Channel (PUCCH) and Sounding Reference Signal (SRS). The LTE uplink power control uses a control mode of combining an open loop with a closed loop.

In the LTE system, the transmitted power of the PUCCH of a User Equipment (UE) on a subframe i is defined as:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}_{[dBm]}$$

wherein, $P_{CMAX}$ is the Configured Maximum UE output power configured by the UE, and the value range of $P_{CMAX}$ is co-determined by multiple parameters, which include: the maximum UE power determined by the UE power class, the maximum configuration power of the system configuration (IE P-Max), the maximum configuration output power offset ($P_{CMAX}$ tolerance), Maximum Power Reduction (MPR) and Additional Maximum Power Reduction (A-MPR) and so on;

$P'_{PUCCH}(i) = P_{0\_PUCCH} + PL + h(n_{CQI}, n_{HARQ}) + \Delta_{F\_PUCCH}(F) + g(i)$ is the transmitted power of the PUCCH estimated by the UE according to open loop power control commands and closed loop power control commands of a base station, path loss estimation, and PUCCH formats scheduled on the subframe i;

$P_{O\_PUCCH}$ is an open loop power control parameter, and is a sum of a cell-specific quantity $P_{O\_NOMINAL\_PUCCH}$ and a UE-specific quantity $P_{O\_UE\_PUCCH}$;

$\Delta_{F\_PUCCH}(F)$ is a power offset related to a PUCCH format (F) and configured by the upper level;

h(n) is a value based on the PUCCH format(F), wherein, $n_{CQI}$ is the number of information bits of Channel Quality Indicator (CQI), and $n_{HARQ}$ is the number of bits of Hybrid Automatic Repeat Request (HARQ);

g(i) is a current power control adjustment state of the PUCCH, which is shown in the following formula:

$$g(i) = g(i-1) + \sum_{m=0}^{M-1} \delta_{PUCCH}(i-k_m)$$

wherein, in a Frequency Division Duplex (FDD) system, there are M=1, $k_0$=4. That is, in the FDD system, a power control adjustment state g(i) of the PUCCH on the subframe i (i.e. the current power control adjustment state) is an accumulated value of a power control adjustment state g(i−1) on the subframe i−1 and a Transmitted power Control (TPC) command $\delta_{PUCCH}$ indicated by the base station on the subframe i−4.

In a Time Division Duplex (TDD) system, values of M and $k_m$ are related to Uplink and downlink configurations. That is, in the TDD system, the power control adjustment state g(i) of the PUCCH on the subframe i (i.e. the current power control adjustment state) is an accumulated value of the power control adjustment state g(i−1) on the subframe i−1 and a sum of multiple transmitted power control commands PUCCH indicated by the base station on subframes i−$k_0$, i−$k_1$, . . . , i−$k_{M-1}$.

In the TDD system, when the subframe i is a downlink frame, there is g(i)=g(i−1). The transmitted power control command $\delta_{PUCCH}$ is a UE-specific closed loop correction value and sent by the base station to a destination UE through a Physical Downlink Control Channel (PDCCH).

The physical downlink control channel bears Downlink Control Information (DCI), which includes downlink or uplink scheduling information and an uplink transmitted power control command and so on. According to different downlink control information, the LTE system defines various downlink control information formats (DCI formats). The transmitted power control commands of the PUCCH are contained in DCI format 1A/1B/1D/1/2A/2 and DCI format 3/3A, each TPC command is of 1 bit or 2 bits and indicates a value of $\delta_{PUCCH}$, and a mapping relationship between the TPC command and $\delta_{PUCCH}$ is shown in tables 1 and 2.

TABLE 1 the mapping relationship between the TPC Command and $\delta_{PUCCH}$ in DCI format 1A/1B/1D/1/2A/2/3

| TPC Command Field in DCI format 1A/1B/1D/1/2A/2/3 | $\delta_{PUCCH}$ [dB] |
| --- | --- |
| 0 | −1 |
| 1 | 0 |
| 2 | 1 |
| 3 | 3 |

TABLE 2 the mapping relationship between the TPC command and in DCI format 3A

| TPC Command Field in DCI format 3A | $\delta_{PUCCH}$ [dB] |
| --- | --- |
| 0 | −1 |
| 1 | 1 |

Figure 1:
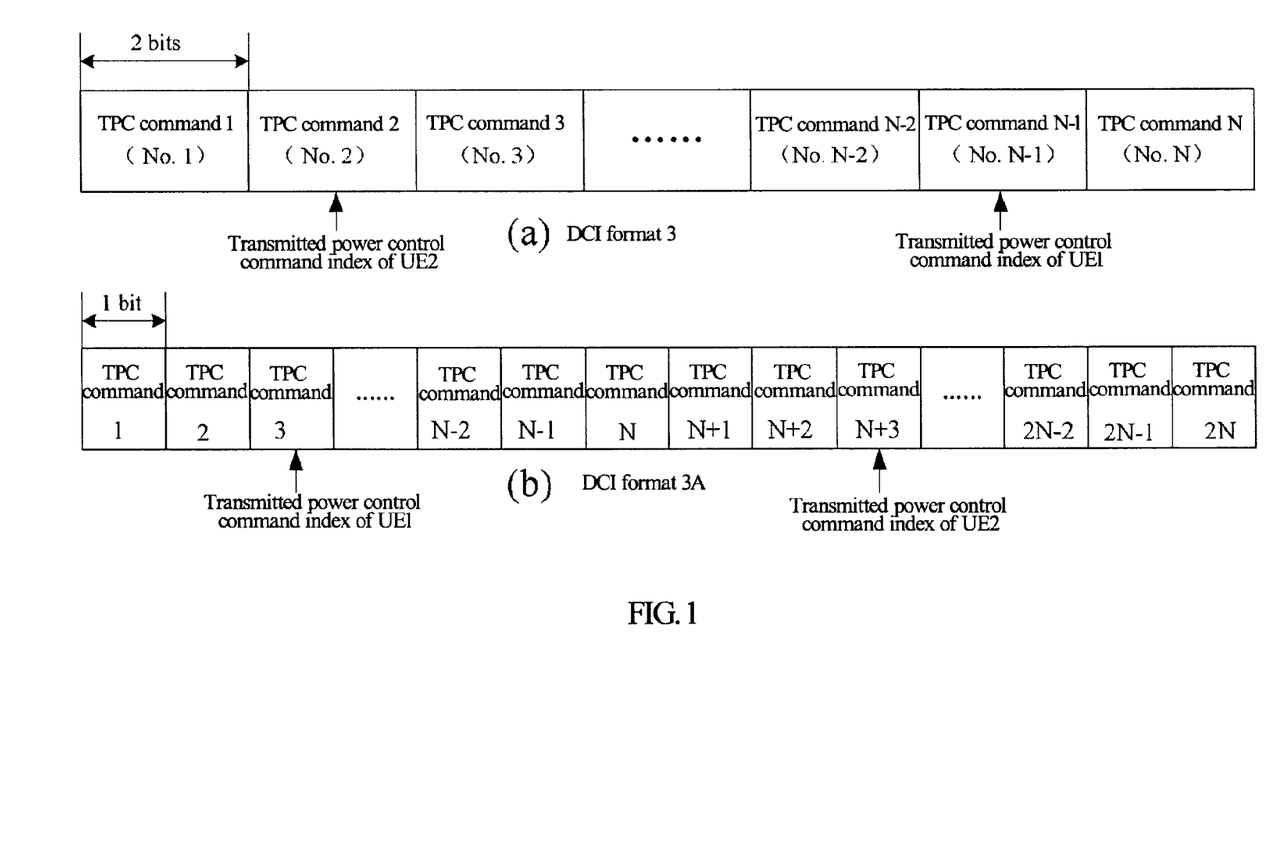
FIG. 1 is a schematic diagram of the format of Downlink Control Information (DCI) format 3/3A in the LTE system.

Wherein, DCI format 3/3A contain the TPC commands of multiple UEs, formats of DCI format 3/3A are as shown in table 1, and after receiving the DCI format 3/3A of the PDCCH, different UEs find out their own TPC commands in corresponding positions therein according to a parameter, namely "a transmitted power control index tpc-Index", configured by the upper level. For the DCI format 3, the values of the transmitted power control index tpc-Index are the integers within the range of [1,15]; and for the DCI format 3A, the values of the transmitted power control indexes tpc-Index are the integers within the range of [1,31].

DCI formats 1A/1B/1D/1/2A/2 only contain one TPC command aiming at the destination UE thereof The TPC command is precisely the transmitted power control command of the PUCCH corresponding to a Physical Downlink Shared Channel (PDSCH) scheduled by the DCI format.

If the UE does not detect any TPC command on a certain subframe, then $\delta_{PUCCH}$=0 dB.

The Physical Uplink Control Channel (PUCCH) bears Uplink Control Information (UCI), which includes Scheduling Request (SR), response information (ACK/NACK) of the Physical Downlink Shared Channel (PDSCH), and feedback quantity/Precoding Matrix Indicator (PMI)/Rank Indication (RI) related to the CQI.

In the LTE system, a resource index of the PUCCH for sending the response information ACK/NACK of one or more PDSCHs is mapped implicitly by a Control Channel Element (CCE) index of the PDCCH which schedules the PDSCH, or is configured by an upper level signaling.

Figure 2:
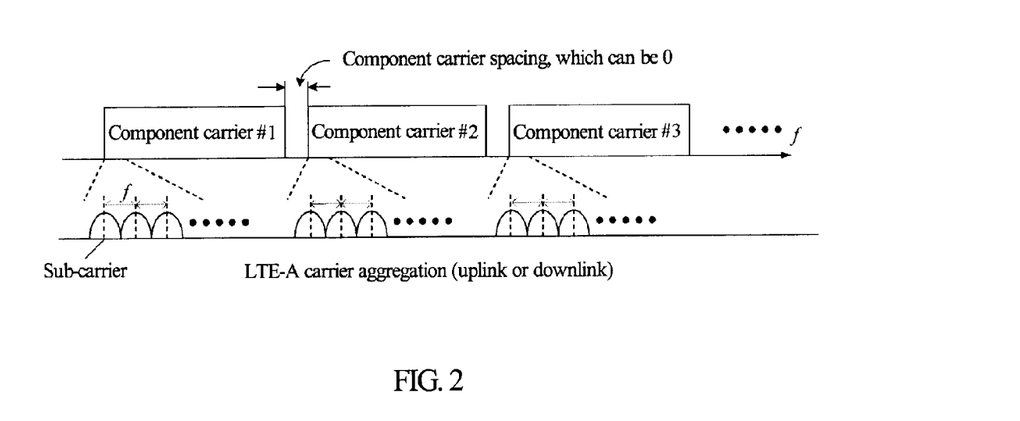
FIG. 2 is a schematic diagram of carrier aggregation in the LTE-A system.

In a LTE-Advanced system (called LTE-A system for short) is the next generation advanced system of the LTE system. As shown in FIG. 2, the LTE-A system adopts a carrier aggregation technique to expand transmission bandwidth, and each aggregated carrier is called as one component carrier (CC). Multiple component carriers can be either successive or not successive, and can be located at either the same operating band or different operating bands.

In the LTE-A system, the user equipment can send multiple Physical Downlink Shared Channels (PDSCH) simultaneously on multiple (downlink) component carriers. The response information ACK/NACK of multiple PDSCHs can be sent by multiple Physical Uplink Control Channels (PUCCH) on one user equipment-specific (uplink) component carrier, or sent by one PUCCH on one user equipment-specific (uplink) component carrier. When the response information, namely Acknowledge/Non-acknowledge (ACK/NACK), of the PDSCHs on multiple component carriers is sent on one PUCCH by the way of ACK/NACK bundling or ACK/NACK multiplexing, how the user equipment determines the current power control adjustment state of the PUCCH and then determines the transmitted power of the PUCCH according to the transmitted power control commands indicated by the base station becomes a problem required to be solved urgently.

SUMMARY OF THE INVENTION

The technical problem required to be solved by the present invention is to provide a power control method, a base station and a user equipment for a Physical Uplink Control Channel (PUCCH), wherein, when response information ACK/NACK of multiple Physical Downlink Shared Channels (PDSCH) sent by a base station on multiple component carriers is sent on one PUCCH, a user equipment can determine a current power control adjustment state of the PUCCH and then determine transmitted power of the PUCCH according to transmitted power control commands indicated by the base station.

In order to solve the above problem, the present invention provides a power control method for a Physical Uplink Control Channel, which comprises:

when response information of multiple Physical Downlink Shared Channels (PDSCH) sent by a base station on multiple component carriers is sent on one Physical Uplink Control Channel (PUCCH), the base station indicating a unified transmitted power control command for the Physical Uplink Control Channel; or the base station indicating multiple transmitted power control commands for the Physical Uplink Control Channel.

The transmitted power control command is transmitted in downlink control information borne by a Physical Downlink Control Channel (PDCCH); wherein, The downlink control information is a downlink control information format encoded jointly by multiple transmitted power control commands; or the downlink control information is the downlink control information format(s) used to schedule one or more PDSCHs in the multiple PDSCHs.

When the downlink control information is the downlink control information format encoded jointly by multiple transmitted power control commands, the method further comprises: the base station configuring a transmitted power control index for the PUCCH, which is used to indicate a position of the transmitted power control command in the downlink control information format encoded jointly by multiple transmitted power control commands.

When the downlink control information is the downlink control information format encoded jointly by multiple transmitted power control commands, the method further comprises: sending the physical downlink control channel bearing the downlink control information format encoded jointly by multiple transmitted power control commands on a user equipment-specific component carrier; wherein, the specific component carrier comprises: a component carrier sending the physical uplink control channel, or a downlink component carrier paired with an uplink component carrier sending the physical uplink control channel, or an anchor component carrier of the user equipment.

The base station sends a power control adjustment state g(i) of the PUCCH on a subframe i;

the power control adjustment state g(i) is an absolute value transmitted power control:

$$g(i) = \sum_{m=0}^{M-1} \delta_{PUCCH}(i - k_m)$$

or the power control adjustment state g(i) is an accumulated value power control:

$$g(i) = g(i-1) + \sum_{m=0}^{M-1} \delta_{PUCCH}(i - k_m)$$

wherein, g(i−1) is the power control adjustment state of the PUCCH on a subframe i−1, M and $k_m$ are related to configurations of a system, and $$\sum_{m=0}^{M-1} \delta_{PUCCH}(i - k_m)$$

is a sum of the transmitted power control commands indicated by the base station on subframes $i-k_0, i-k_1, \ldots, i-k_{M-1}$.

When the system is a frequency division duplex system, there are M=1, $k_0$=4 and $$\sum_{m=0}^{M-1} \delta_{PUCCH}(i-k_m) = \delta_{PUCCH}(i-4).$$

When the system is a time division duplex system, values of M and $k_m$ are related to uplink and downlink configurations of the time division duplex system.

When the base station indicates the unified transmitted power control command for the physical uplink control channel, the method further comprises:

if a user equipment detects one or more downlink control information formats used to schedule multiple physical downlink shared channels on the multiple component carriers on the subframe i, the user equipment taking the transmitted power control commands contained in the one or more downlink control information formats as the transmitted power control command $\delta_{PUCCH}(i)$ of the physical uplink control channel indicated by the base station on the subframe i;

if the user equipment detects the downlink control information format encoded jointly by multiple transmitted power control commands on the subframe i, the user equipment taking corresponding transmitted power control commands contained in the downlink control information format encoded jointly by the multiple transmitted power control commands as the transmitted power control command $\delta_{PUCCH}(i)$ of the physical uplink control channel indicated by the base station on the subframe i; and if the user equipment does not detect one or more downlink control information formats used to schedule multiple physical downlink shared channels on the multiple component carriers on the subframe i, and if the user equipment does not detect the downlink control information format encoded jointly by the multiple transmitted power control commands on the subframe i either, then $\delta_{PUCCH}(i)$=0 dB.

When the base station indicates multiple transmitted power control commands for the physical uplink control channel:

there is $$\delta_{PUCCH}(i-4) = \text{func}\{\delta_{PUCCH}{}^{c1}(i-4), \ldots, \delta_{PUCCH}{}^{cj}(i-4), \ldots, \delta_{PUCCH}{}^{cN}(i-4)\}$$

Or, if a resource index of the physical uplink control channel bearing the response information of N physical downlink shared channels is mapped implicitly by a Control Channel Element (CCE) index of the physical downlink control channel which schedules the physical downlink shared channel on a component carrier $c_h$, thus $$\delta_{PUCCH}(i-4) = \delta_{PUCCH}{}^{ch}(i-4)$$

wherein, func{•} represents one function; N is the number of PDSCHs transmitting response information thereof on the PUCCH; and $\delta_{PUCCH}{}^{cj}(i-4)$ is as follows:

if the user equipment detects the downlink control information format used to schedule the physical downlink shared channel on the component carrier $c_j$ on a subframe i−4, the user equipment taking the transmitted power control commands contained in the downlink control information format as the $\delta_{PUCCH}{}^{cj}(i-4)$, wherein, the component carrier $c_j$ is one of the multiple component carriers;

if the user equipment detects the downlink control information format encoded jointly by multiple transmitted power control commands on the subframe i−4, the user equipment taking the transmitted power control commands of the physical uplink control channel which bears the response information of the physical downlink shared channel on the component carrier $c_j$ contained in the downlink control information format as the $\delta_{PUCCH}{}^{cj}(i-4)$; and if the user equipment does not detect the downlink control information format used to schedule the physical downlink shared channel on the component carrier $c_j$ on the subframe i−4, and if the user equipment does not detect the downlink control information format encoded jointly by the multiple transmitted power control commands on the subframe i−4 either, then $\delta_{PUCCH}{}^{cj}(i-4)$=0 dB.

When the base station indicates multiple transmitted power control commands for the physical uplink control channel:

there is $$\sum_{m=0}^{M-1} \delta_{PUCCH}(i-k_m) = \sum_{m=0}^{M-1} \text{func}\{\delta_{PUCCH}^{c_1}(i-k_m), \ldots, \delta_{PUCCH}^{c_j}(i-k_m), \ldots, \delta_{PUCCH}^{c_N}(i-k_m)\} \text{ or,}$$

$$\sum_{m=0}^{M-1} \delta_{PUCCH}(i-k_m) = \text{func}\left\{\sum_{m=0}^{M-1} \delta_{PUCCH}^{c_1}(i-k_m), \ldots, \sum_{m=0}^{M-1} \delta_{PUCCH}^{c_j}(i-k_m), \ldots, \sum_{m=0}^{M-1} \delta_{PUCCH}^{c_N}(i-k_m)\right\}$$

Or, if the resource index of the physical uplink control channel bearing the response information of N physical downlink shared channels is mapped implicitly by the CCE index of the physical downlink control channel which schedules the physical downlink shared channel on the component carrier $c_h$, thus $$\sum_{m=0}^{M-1} \delta_{PUCCH}(i-k_m) = \sum_{m=0}^{M-1} \delta_{PUCCH}^{c_h}(i-k_m)$$

wherein, func{•} represents one function, and $\delta_{PUCCH}{}^{cj}(i-k_m)$ is as follows:

if the user equipment detects the downlink control information format used to schedule the physical downlink shared channel on the component carrier $c_j$ on a subframe i−$k_m$, the user equipment taking the transmitted power control commands contained in the downlink control information format as the $\delta_{PUCCH}{}^{cj}(i-k_m)$, wherein, the component carrier $c_j$ is one of the multiple component carriers;

if the user equipment detects the downlink control information format encoded jointly by multiple transmitted power control commands on the subframe i−$k_m$, the user equipment taking the transmitted power control commands of the physical uplink control channel which bears the response information of the physical downlink shared channel on the component carrier $c_j$ contained in the downlink control information format as the $\delta_{PUCCH}{}^{cj}(i-k_m)$; and if the user equipment does not detect the downlink control information format used to schedule the physical downlink shared channel on the component carrier $c_j$ on the subframe i−$k_m$, and if the user equipment does not detect the downlink control information format encoded jointly by multiple transmitted power control commands on the subframe i−$k_m$, then $\delta_{PUCCH}{}^{cj}(i-k_m)$=0 dB.

The function func{•} is:

taking a minimum value, or a maximum value, or an average value, or a median value, or a sum in {•}.

The method further comprises:

a user equipment determining to use the accumulated value power control or absolute value power control for the physical uplink control channel according to parameters configured by an upper level signaling.

In order to solve the above problem, the present invention further provides a base station, which is configured to:

when response information of multiple Physical Downlink Shared Channels (PDSCH) sent on multiple component carriers is sent on one Physical Uplink Control Channel (PUCCH), indicate a unified transmitted power control command for the PUCCH; or indicate multiple transmitted power control commands for the PUCCH.

The base station is further configured to:

transmit the transmitted power control command in downlink control information borne by a physical downlink control channel, wherein:

the downlink control information is a downlink control information format encoded jointly by multiple transmitted power control commands; or the downlink control information is the downlink control information format(s) used to schedule one or more PDSCHs in the multiple PDSCHs.

In order to solve the above problem, the present invention further provides a user equipment, which is configured to:

when a base station sends response information of multiple Physical Downlink Shared Channels (PDSCH) sent on multiple component carriers on one Physical Uplink Control Channel (PUCCH), receive a unified transmitted power control command or multiple transmitted power control commands indicated by the base station for the PUCCH, and determine a power control adjustment state g(i) of the PUCCH sent on a subframe i as an absolute value power control according to the transmitted power control command:

$$g(i) = \sum_{m=0}^{M-1} \delta_{PUCCH}(i - k_m)$$

or as an accumulated value power control:

$$g(i) = g(i-1) + \sum_{m=0}^{M-1} \delta_{PUCCH}(i - k_m)$$

wherein, g(i−1) is the power control adjustment state, which is the absolute value power control, of the PUCCH sent on a subframe i−1, M and $k_m$ are related to configurations of a system, and $$\sum_{m=0}^{M-1} \delta_{PUCCH}(i - k_m)$$

is a sum of the transmitted power control commands indicated by the base station on subframes $i-k_0, i-k_1, \ldots, k_{M-1}$.

When the system is a frequency division duplex system, there are M=1, $k_0$=4 and $$\sum_{m=0}^{M-1} \delta_{PUCCH}(i - k_m) = \delta_{PUCCH}(i - 4);$$

when the system is a time division duplex system, values of M and $k_m$ are related to uplink and downlink configurations of the time division duplex system.

The user equipment is further configured to: when one or more downlink control information formats used to schedule multiple physical downlink shared channels on the multiple component carriers on the subframe i are detected, take the transmitted power control commands contained in the one or more downlink control information formats as the transmitted power control command $\delta_{PUCCH}(i)$ of the physical uplink control channel indicated by the base station on the subframe i;

if a downlink control information format encoded jointly by multiple transmitted power control commands on the subframe i is detected, take corresponding transmitted power control commands contained in the downlink control information format encoded jointly by the multiple transmitted power control commands as the transmitted power control command $\delta_{PUCCH}(i)$ of the physical uplink control channel indicated by the base station on the subframe i; and if a user equipment does not detect one or more downlink control information formats used to schedule multiple physical downlink shared channels on the multiple component carriers on the subframe i, and if the user equipment does not detect the downlink control information format encoded jointly by the multiple transmitted power control commands on the subframe i, there is $\delta_{PUCCH}(i)$=0 dB.

The user equipment is further configured to: when the system is the frequency division duplex system, determine the $$\sum_{m=0}^{M-1} \delta_{PUCCH}(i - k_m)$$

according to the following way:

$$\sum_{m=0}^{M-1} \delta_{PUCCH}(i - k_m) = \delta_{PUCCH}(i - 4), \text{ wherein}$$

$$\delta_{PUCCH}(i - 4) =$$
$$func\{\delta_{PUCCH}^{c_1}(i-4), \ldots, \delta_{PUCCH}^{c_j}(i-4), \ldots, \delta_{PUCCH}^{c_N}(i-4)\}$$

Or, if a resource index of the physical uplink control channel bearing the response information of N physical downlink shared channels is mapped implicitly by a Control Channel Element (CCE) index of a physical downlink control channel which schedules the physical downlink shared channel on a component carrier $c_h$, thus $$\delta_{PUCCH}(i-4) = \delta_{PUCCH}^{c_h}(i-4)$$

wherein, func{•} represents one function; N is the number of PDSCHs transmitting the response information thereof on the PUCCH; and $\delta_{PUCCH}^{c_j}(i-4)$ is as follows:

if the user equipment detects the downlink control information format used to schedule the physical downlink shared channel on the component carrier $c_j$ on a subframe i−4, the user equipment taking the transmitted power control commands contained in the downlink control information format as the $\delta_{PUCCH}{}^{cj}(i-4)$, wherein, the component carrier $c_j$ is one of the multiple component carriers;

if the user equipment detects the downlink control information format encoded jointly by multiple transmitted power control commands on the subframe i–4, the user equipment taking the transmitted power control commands of the physical uplink control channel which bears the response information of the physical downlink shared channel on the component carrier $c_j$ contained in the downlink control information format as the $\delta_{PUCCH}{}^{cj}(i-4)$; and if the user equipment does not detect the downlink control information format used to schedule the physical downlink shared channel on the component carrier $c_j$ on the subframe i–4, and does not detect the downlink control information format encoded jointly by the multiple transmitted power control commands on the subframe i–4, then $\delta_{PUCCH}{}^{cj}(i-4)=$ 0 dB.

The user equipment is further configured to: in the time division duplex system, determine the $$\sum_{m=0}^{M-1} \delta_{PUCCH}(i-k_m)$$

according to the following way:

$$\sum_{m=0}^{M-1} \delta_{PUCCH}(i-k_m) =$$

$$\sum_{m=0}^{M-1} func\{\delta_{PUCCH}^{c_1}(i-k_m), \ldots, \delta_{PUCCH}^{c_j}(i-k_m), \ldots, \delta_{PUCCH}^{c_N}(i-k_m)\} \text{ or,}$$

$$\sum_{m=0}^{M-1} \delta_{PUCCH}(i-k_m) = func$$

$$\left\{\sum_{m=0}^{M-1} \delta_{PUCCH}^{c_1}(i-k_m), \ldots, \sum_{m=0}^{M-1} \delta_{PUCCH}^{c_j}(i-k_m), \ldots, \sum_{m=0}^{M-1} \delta_{PUCCH}^{c_N}(i-k_m)\right\}$$

Or, if the resource index of the physical uplink control channel bearing the response information of N physical downlink shared channels is mapped implicitly by the CCE index of the physical downlink control channel which schedules the physical downlink shared channel on the component carrier $c_h$, thus $$\sum_{m=0}^{M-1} \delta_{PUCCH}(i-k_m) = \sum_{m=0}^{M-1} \delta_{PUCCH}^{c_h}(i-k_m)$$

wherein, func{•} represents one function, and $\delta_{PUCCH}{}^{cj}(i-k_m)$ is as follows:

if the user equipment detects the downlink control information format used to schedule the physical downlink shared channel on the component carrier $c_j$ on a subframe $i-k_m$, the user equipment taking the transmitted power control commands contained in the downlink control information format as the $\delta_{PUCCH}{}^{cj}(i-k_m)$, wherein, the component carrier $c_j$ is one of the multiple component carriers;

if the user equipment detects the downlink control information format encoded jointly by multiple transmitted power control commands on the subframe $i-k_m$, the user equipment taking the transmitted power control commands of the physical uplink control channel which bears the response information of the physical downlink shared channel on the component carrier $c_j$ contained in the downlink control information format as the $\delta_{PUCCH}{}^{cj}(i-k_m)$; and if the user equipment does not detect the downlink control information format used to schedule the physical downlink shared channel on the component carrier $c_j$ on the subframe $1-k_m$, and does not detect the downlink control information format encoded jointly by multiple transmitted power control commands on the subframe $i-k_m$, then $\delta_{PUCCH}{}^{cj}(i-k_m)=0$ dB.

The function func{•} is:

taking a minimum value, or a maximum value, or an average value, or a median value, or a sum in {•}.

The user equipment is further configured to: determine to use the accumulated value power control or absolute value power control for the PUCCH according to an upper level signaling.

The power control method, base station and user equipment for the physical uplink control channel provided by the present invention solve the problem that, in the LTE-A system using the carrier aggregation, when the response information ACK/NACK of the Physical Downlink Shared Channels (PDSCH) on multiple component carriers is sent on one Physical Uplink Control Channel (PUCCH), how the user equipment determines a current power control adjustment state of the PUCCH and then determines transmitted power of the PUCCH according to the transmitted power control commands indicated by the base station.

BRIEF DESCRIPTION OF DRAWINGS

The accompanying drawings are used to provide a further understanding of the present invention, constitute a part of the present invention, and explain the present invention together with the examples of the present invention, but are not intended to limit the present invention. In the drawings.

PREFERRED EMBODIMENTS OF THE PRESENT INVENTION

The present invention will be described in detail in combination with the examples and accompanying drawings below.

Figure 3:
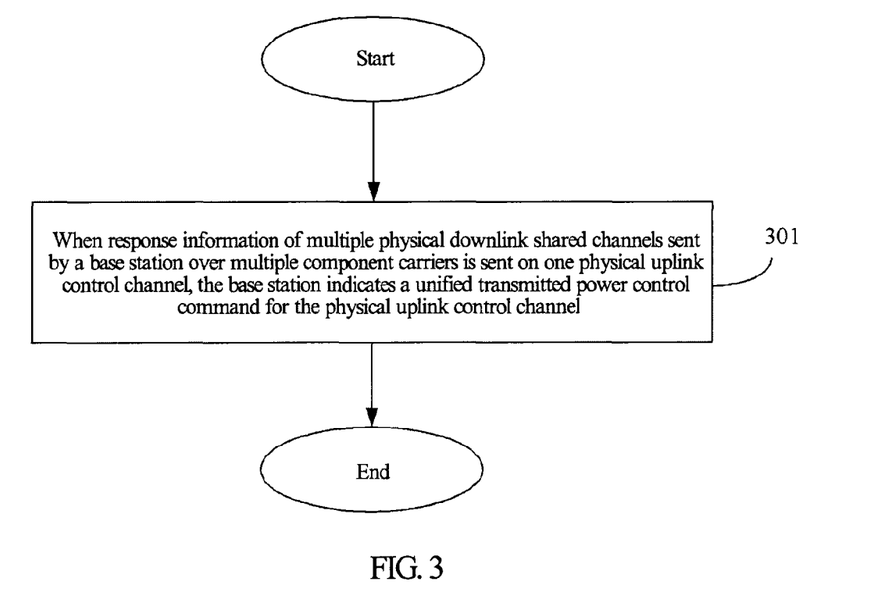
FIG. 3 is a schematic diagram of method 1 according to the example of the present invention.

Method 1:

In step 301, when response information of multiple physical downlink shared channels sent by a base station over multiple component carriers is sent on one physical uplink control channel, the base station indicates a unified transmitted power control command for the physical uplink control channel.

The transmitted power control command is transmitted in downlink control information borne by a physical downlink control channel, including but not limited to being transmitted in Downlink Control Information (DCI) format 3/3A encoded jointly by multiple transmitted power control commands, and is transmitted in downlink control information format(s) used to schedule one or more PDSCHs in the multiple PDSCHs, including but not limited to DCI format 1A/1B/1D/1/2A/2.

When the above transmitted power control command is transmitted in DCI format 3/3A, the base station configures a transmitted power control index tpc-index for the Physical Uplink Control Channel (PUCCH) of a user equipment, which is used to indicate the position of the transmitted power control command in the DCI format 3/3A encoded jointly by multiple transmitted power control commands.

The Physical Downlink Control Channel (PDCCH) bearing the DCI format 3/3A is sent on a user equipment-specific component carrier, including but not limited to being sent over a component carrier sending the physical uplink control channel (i.e. a time division duplex system), or being sent over a downlink component carrier paired with an uplink component carrier sending the physical uplink control channel (i.e. a frequency division duplex system), or being sent over an anchor Component Carrier of the user equipment.

If the user equipment detects one or more downlink control information formats used to schedule multiple physical downlink shared channels on the multiple component carriers on a subframe i, the user equipment takes the transmitted power control commands contained in the one or more downlink control information formats as the transmitted power control command $\delta_{PUCCH}(i)$ of the physical uplink control channel indicated by the base station on the subframe i;

otherwise, if the user equipment detects the downlink control information format encoded jointly by multiple transmitted power control commands on the subframe i, the user equipment takes corresponding transmitted power control commands contained in the downlink control information format encoded jointly by the multiple transmitted power control commands as the transmitted power control command $\delta_{PUCCH}(i)$ of the physical uplink control channel indicated by the base station on the subframe i; and if the user equipment does not detect one or more downlink control information formats used to schedule multiple physical downlink shared channels on the multiple component carriers on the subframe i, or does not detect the downlink control information format encoded jointly by the multiple transmitted power control commands, then $\delta_{PUCCH}(i)=0$ dB.

Figure 4:
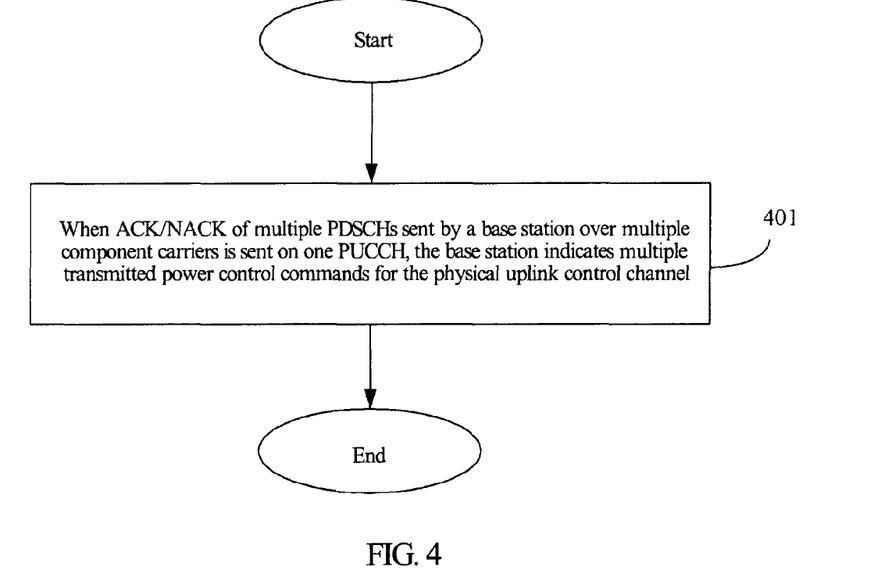
FIG. 4 is a schematic diagram of method 2 according to the example of the present invention.

Method 2:

In step 401, when ACK/NACK of multiple PDSCHs sent by a base station over multiple component carriers is sent on one PUCCH, the base station indicates multiple transmitted power control commands for the physical uplink control channel.

The transmitted power control commands are transmitted in downlink control information borne by a physical downlink control channel, including but not limited to being transmitted in Downlink Control Information (DCI) format 3/3A encoded jointly by multiple transmitted power control commands, and are transmitted in downlink control information formats used to schedule multiple PDSCHs on the multiple component carriers, including but not limited to DCI format 1A/1B/1D/1/2A/2.

If a user equipment detects a downlink control information format used to schedule a physical downlink shared channel on a component carrier $c_j$ on a subframe i, the user equipment takes the transmitted power control commands contained in the downlink control information format as the $\delta_{PUCCH}^{c_j}(i)$, wherein, the component carrier $c_j$ is one of the multiple component carriers, and $c_j$ is a sequence number of the component carrier;

otherwise, if the user equipment detects the downlink control information format encoded jointly by multiple transmitted power control commands on the subframe i, the user equipment takes the transmitted power control commands of the physical uplink control channel which bears the response information ACK/NACK of the physical downlink shared channel on the component carrier $c_j$ contained in the downlink control information format as the $\delta_{PUCCH}^{c_j}(i)$; and if the user equipment does not detect the downlink control information formats used to schedule multiple physical downlink shared channels on the component carrier on the subframe i, or does not detect the downlink control information format encoded jointly by the multiple transmitted power control commands on the subframe, there is $\delta_{PUCCH}^{c_j}(i)=0$ dB.

Thus, N transmitted power control commands used for the physical uplink control channel of the user equipment on the subframe i are $\{\delta_{PUCCH}^{c_j}(i)\}$ j=1, . . . , N, wherein, N is the number of the Physical Downlink Shared Channels (PDSCH) sending the response information (ACK/NACK) of the PDSCHs on the Physical Uplink Control Channel (PUCCH), and $\{c_j\}$ j=1, . . . , N are sequence numbers of N component carriers sending N physical downlink shared channels. The N $\delta_{PUCCH}^{c_j}(i-k_m)$s on a subframe $i-k_m$ also can be obtained according to the above description.

1) in the FDD system, the user equipment uses one function of $\{\delta_{PUCCH}^{n}(i)\}$ n=1, . . . , N as the transmitted power control command $\delta_{PUCCH}(i)$ of the Physical Uplink Control Channel (PUCCH) on the subframe i, that is $$\delta_{PUCCH}(i)=\text{func}\{\delta_{PUCCH}^{c1}(i),\ldots,\delta_{PUCCH}^{cj}(i),\ldots,\delta_{PUCCH}^{cN}(i)\} j=1,\ldots,N$$

the function func{•} is:

taking a minimum value, or a maximum value, or an average value, or a median value, or a sum in {•};

or, if a resource index of the physical uplink control channel bearing the response information ACK/NACK of N physical downlink shared channels is mapped implicitly by a CCE index of the physical downlink control channel which schedules the physical downlink shared channel on the component carrier $c_h$, thus $$\delta_{PUCCH}(i)=\delta_{PUCCH}^{ch}(i)$$

2) in the TDD system, the user equipment uses one function of $\{\delta_{PUCCH}^{n}(i)\}$ n=1, . . . , N as the transmitted power control command $\delta_{PUCCH}(i)$ of the Physical Uplink Control Channel (PUCCH) on the subframe i, that is $$\delta_{PUCCH}(i)=\text{func}\{\delta_{PUCCH}^{c1}(i),\ldots,\delta_{PUCCH}^{cj}(i),\ldots,\delta_{PUCCH}^{cN}(i)\} j=1,\ldots,N$$

thus, a sum of transmitted power control commands $\delta_{PUCCH}$ of the Physical Uplink Control Channel (PUCCH) on subframes $i-k_0, i-k_1, \ldots, i-k_{M-1}$ is $$\sum_{m=0}^{M-1}\delta_{PUCCH}(i-k_m)=$$

$$\sum_{m=0}^{M-1}\text{func}\{\delta_{PUCCH}^{c1}(i-k_m),\ldots,\delta_{PUCCH}^{cj}(i-k_m),\ldots,\delta_{PUCCH}^{cN}(i-k)\} j=1,\ldots,N$$

wherein, values of M and $k_m$ are related to uplink and downlink configurations of the system.

The function func{•} is:

taking a minimum value, or a maximum value, or an average value, or a median value, or a sum in {•};

3) in the TDD system, the user equipment accumulates N transmitted power control commands $\{\delta_{PUCCH}^{c_j}(i)\}$ j=1, ..., N on the subframes $i-k_0, i-k_1, \ldots, i-k_{M-1}$ respectively:

$$\sum_{m=0}^{M-1} \delta_{PUCCH}^{c_1}(i-k_m), \ldots, \sum_{m=0}^{M-1} \delta_{PUCCH}^{c_j}(i-k_m), \ldots, \sum_{m=0}^{M-1} \delta_{PUCCH}^{c_N}(i-k_m)$$

wherein, values of M and $k_m$ are related to uplink and downlink configurations of the system.

Then, one function of $$\left\{\sum_{m=0}^{M-1} \delta_{PUCCH}^{c_j}(i-k_m)\right\}$$

j=1, ..., N is taken as a sum of transmitted power control commands $\delta_{PUCCH}$ of the Physical Uplink Control Channel (PUCCH) on the subframes $i-k_0, i-k_1, \ldots, i-k_{M-1}$, that is $$\sum_{m=0}^{M-1} \delta_{PUCCH}(i-k_m) = \operatorname{func}\left\{\begin{array}{c} \sum_{m=0}^{M-1} \delta_{PUCCH}^{c_1}(i-k_m), \ldots, \sum_{m=0}^{M-1} \delta_{PUCCH}^{c_j}(i-k_m), \ldots, \\ \sum_{m=0}^{M-1} \delta_{PUCCH}^{c_N}(i-k_m) \end{array}\right\}$$

the function func{•} is:

taking a minimum value, or a maximum value, or an average value, or a median value, or a sum in {•};

or, if the resource index of the physical uplink control channel bearing the response information ACK/NACK of N physical downlink shared channels is mapped implicitly by the CCE index of the physical downlink control channel which schedules the physical downlink shared channel on the component carrier $c_h$, thus $$\sum_{m=0}^{M-1} \delta_{PUCCH}(i-k_m) = \sum_{m=0}^{M-1} \delta_{PUCCH}^{c_h}(i-k_m)$$

In methods of 1 and 2, a power control adjustment state (i.e. a current power control adjustment state) g(i) of the Physical Uplink Control Channel (PUCCH) on the subframe i is $$g(i) = \sum_{m=0}^{M-1} \delta_{PUCCH}(i-k_m) \quad (1)$$

or $$g(i) = g(i-1) + \sum_{m=0}^{M-1} \delta_{PUCCH}(i-k_m) \quad (2)$$

wherein, in the frequency division duplex system, M=1 and $k_0$=4; in the time division duplex system, values of M and $k_m$ are related to uplink and downlink configurations of the system.

Wherein, formula (1) is called as an absolute value power control, that is:

in the FDD system, the power control adjustment state (i.e. the current power control adjustment state) g(i) of the Physical Uplink Control Channel (PUCCH) on the subframe i is the transmitted power control command $\delta_{PUCCH}$ indicated by the base station on a subframe i−4;

in the TDD system, the power control adjustment state (i.e. the current power control adjustment state) g(i) of the Physical Uplink Control Channel (PUCCH) on the subframe i is the sum of multiple transmitted power control commands $\delta_{PUCCH}$ indicated by the base station on the subframes $i-k_0$, $i-k_1, \ldots, i-k_{M-1}$.

Formula (2) is called as an accumulated value power control, that is:

in the FDD system, the power control adjustment state (i.e. the current power control adjustment state) g(i) of the Physical Uplink Control Channel (PUCCH) on the subframe i is an accumulated value of a power control adjustment state g(i−1) on a subframe i−1 and the transmitted power control command $\delta_{PUCCH}$ indicated by the base station on the subframe i−4;

in the TDD system, the power control adjustment state (i.e. the current power control adjustment state) g(i) of the Physical Uplink Control Channel (PUCCH) sent on the subframe i is the accumulated value of the power control adjustment state g(i−1) on the subframe i−1 and the sum of multiple transmitted power control commands $\delta_{PUCCH}$ indicated by the base station on the subframes $i-k_0, i-k_1, \ldots, i-k_{M-1}$.

The user equipment determines to use the accumulated value power control or absolute value power control for the physical uplink control channel according to a user equipment-specific accumulation-enabled power control parameter configured by an upper level signaling.

Example 1

It is assumed that one LTE-A system works in a frequency division duplex mode, the LTE-A system has five downlink component carriers D1, D2, D3, D4 and D5, and five uplink component carriers U1, U2, U3, U4 and U5.

Currently, a base station sends physical downlink shared channels to a user equipment UE1 on the four downlink component carriers D1, D2, D3 and D4, and the user equipment UE1 will send response information ACK/NACK of four PDSCHs on the uplink component carrier U1 through one physical uplink control channel. The base station indicates a unified transmitted power control command for the physical uplink control channel.

The base station sends the transmitted power control command used for the Physical Uplink Control Channel (PUCCH) of the user equipment UE1 in a Downlink Control Information (DCI) format 3 encoded jointly by multiple transmitted power control commands.

A Physical Downlink Control Channel (PDCCH) bearing the DCI format 3 is sent over one user equipment-specific component carrier, for example, is sent over the downlink component carrier D1 paired with the uplink component carrier U1 which sends the Physical Uplink Control Channel (PUCCH), or is sent over an anchor component carrier D2 of the user equipment UE1.

The base station configures a transmitted power control index tpc-index for the Physical Uplink Control Channel (PUCCH) of the user equipment UE1, which is used to indicate the position of the transmitted power control command in the DCI format 3.

When the Physical Uplink Control Channel (PUCCH) is sent, the user equipment UE1 determines to use accumulated value power control for the physical uplink control channel according to an accumulation-enabled power control parameter configured by an upper level signaling.

A current power control adjustment state g(i) of the PUCCH is $$g(i)=g(i-1)+\delta_{PUCCH}(i-4)$$

wherein, g(i−1) is a power control adjustment state on a subframe i−1, and $\delta_{PUCCH}$ is the transmitted power control command indicated by the base station for the Physical Uplink Control Channel (PUCCH) of the user equipment UE1 on a subframe i−4.

Example 2

It is assumed that one LTE-A system works in a frequency division duplex mode, the LTE-A system has five downlink component carriers D1, D2, D3, D4 and D5, and five uplink component carriers U1, U2, U3, U4 and U5.

Currently, a base station sends four physical downlink shared channels PDSCH1, PDSCH2, PDSCH3 and PDSCH4 to a user equipment UE1 on the four downlink component carriers D1, D2, D3 and D4 respectively, and the user equipment UE1 will send response information ACK/NACK of the four PDSCHs on the uplink component carrier U1 through one Physical Uplink Control Channel (PUCCH). The base station indicates a unified transmitted power control command for the PUCCH.

The base station transmits the transmitted power control command used for the Physical Uplink Control Channel (PUCCH) in a downlink control information format which is sent to the user equipment UE1 and used to schedule the physical downlink shared channel PDSCH1 (or PDSCH2 or PDSCH3 or PDSCH4).

Or, the base station transmits four identical transmitted power control commands used for the Physical Uplink Control Channel (PUCCH) in four downlink control information formats respectively which are sent to the user equipment UE1 and used to schedule the physical downlink shared channels PDSCH1, PDSCH2, PDSCH3 and PDSCH4.

When the Physical Uplink Control Channel (PUCCH) is sent, the user equipment UE1 determines to use the absolute value power control for the physical uplink control channel according to an accumulation-enabled power control parameter configured by an upper level signaling.

A current power control adjustment state g(i) of the PUCCH is $$g(i)=\delta_{PUCCH}(i-4)$$

wherein, $\delta_{PUCCH}$ is the transmitted power control command indicated by the base station for the Physical Uplink Control Channel (PUCCH) of the user equipment UE1 on a subframe i−4.

Example 3

It is assumed that one LTE-A system works in a time division duplex mode, and the LTE-A system has five component carriers C1, C2, C3, C4 and C5.

Currently, a base station sends physical downlink shared channels PDSCH1 and PDSCH2 to a user equipment UE1 over two downlink component carriers C1 and C2, and the user equipment UE1 will send response information ACK/NACK of the PDSCH1 and PDSCH2 on the uplink component carrier U1 through one Physical Uplink Control Channel (PUCCH). The base station indicates a unified transmitted power control command for the PUCCH.

The base station transmits two identical transmitted power control commands used for the Physical Uplink Control Channel (PUCCH) in two downlink control information formats respectively which are sent to the user equipment UE1 and used to schedule the physical downlink shared channels PDSCH 1 and PDSCH 2.

Or, the base station transmits one transmitted power control command used for the Physical Uplink Control Channel (PUCCH) in a downlink control information format which is sent to the user equipment UE1 and used to schedule the physical downlink shared channel PDSCH1 or PDSCH2, and sends an identical transmitted power control command used for the PUCCH in Downlink Control Information (DCI) format 3/3A encoded jointly by multiple transmitted power control commands.

When the Physical Uplink Control Channel (PUCCH) is sent, the user equipment UE1 determines to use the absolute value power control for the physical uplink control channel according to an Accumulation-enabled power control parameter configured by an upper level signaling.

A current power control adjustment state g(i) of the PUCCH is $$g(i) = \sum_{m=0}^{M-1} \delta_{PUCCH}(i - k_m)$$

wherein, values of M and $k_m$ are related to uplink and downlink configurations of the system, and $\delta_{PUCCH}(i-k_m)$ is the transmitted power control command indicated by the base station for the Physical Uplink Control Channel (PUCCH) of the user equipment UE1 on a subframe $i-k_m$.

EXAMPLE 4

It is assumed that one LTE-A system works in a frequency division duplex mode, the LTE-A system has five downlink component carriers D1, D2, D3, D4 and D5, and five uplink component carriers U1, U2, U3, U4 and U5.

Currently, a base station sends four physical downlink shared channels PDSCH1, PDSCH2, PDSCH3 and PDSCH4 to a user equipment UE1 over the four downlink component carriers D1, D2, D3 and D4 respectively, and the user equipment UE1 will send response information ACK/NACK of the four PDSCHs over the uplink component carrier U1 through one Physical Uplink Control Channel (PUCCH). The base station indicates multiple transmitted power control commands for the PUCCH.

The base station transmits four transmitted power control commands, which are respectively $\delta_{PUCCH}^1(i)$, $\delta_{PUCCH}^2(i)$, $\delta_{PUCCH}^3(i)$, $\delta_{PUCCH}^4(i)$ and used for the Physical Uplink Control Channel (PUCCH), in four downlink control information formats respectively which are sent to the user equipment UE1 and used to schedule the physical downlink shared channels PDSCH1, PDSCH2, PDSCH3 and PDSCH4.

The user equipment takes a maximum value in $\delta_{PUCCH}^1(i)$, $\delta_{PUCCH}^2(i)$, $\delta_{PUCCH}^3(i)$, $\delta_{PUCCH}^4(i)$ as the transmitted power control command $\delta_{PUCCH}(i)$ of the Physical Uplink Control Channel (PUCCH) on the subframe i, that is $$\delta_{PUCCH}(i)=\max\{\delta_{PUCCH}^1(i), \delta_{PUCCH}^2(i), \delta_{PUCCH}^3(i), \delta_{PUCCH}^4(i)\}$$

or, if a resource index of the Physical Uplink Control Channel (PUCCH) is mapped implicitly by a CCE index of the physical downlink control channel which schedules the physical downlink shared channel PDSCH1 on the downlink component carrier D1, thus $$\delta_{PUCCH}(i) = \delta_{PUCCH}^1(i)$$

When the Physical Uplink Control Channel (PUCCH) is sent, the user equipment UE1 determines to use the absolute value power control for the physical uplink control channel according to an accumulation-enabled power control parameter configured by an upper level signaling.

A current power control adjustment state g(i) of the PUCCH is $$g(i) = \delta_{PUCCH}(i-4)$$

wherein, $\delta_{PUCCH}$ is the transmitted power control command indicated by the base station for the Physical Uplink Control Channel (PUCCH) of the user equipment UE1 on a subframe i−4.

EXAMPLE 5

It is assumed that one LTE-A system works in a time division duplex mode, and the LTE-A system has five component carriers C1, C2, C3, C4 and C5.

Currently, a base station sends physical downlink shared channels PDSCH1, PDSCH2, PDSCH3, PDSCH4 and PDSCH5 to a user equipment UE1 over five downlink component carriers C1, C2, C3, C4 and C5, and the user equipment UE1 will send response information ACK/NACK of the PDSCH1, PDSCH2, PDSCH3, PDSCH4 and PDSCH5 over the uplink component carrier U1 through two physical uplink control channels PDCCH1 and PDCCH2 respectively. The base station indicates multiple transmitted power control commands for the physical uplink control channels PDCCH1 and PDCCH2.

The base station transmits three transmitted power control commands of $\delta_{PUCCH}^1(i)$, $\delta_{PUCCH}^2(i)$, $\delta_{PUCCH}^3(i)$ used for the physical uplink control channel in three downlink control information formats which are sent to the user equipment UE1 and used to schedule the physical downlink shared channels PDSCH1, PDSCH2 and PDSCH3; and the base station transmits two transmitted power control commands of $\delta_{PUCCH}^4(i)$, $\delta_{PUCCH}^5(i)$ used for the physical uplink control channel in two downlink control information formats which are sent to the user equipment UE1 and used to schedule the physical downlink shared channels PDSCH4 and PDSCH5.

The user equipment takes an average value of $\delta_{PUCCH}^1(i)$, $\delta_{PUCCH}^2(i)$, $\delta_{PUCCH}^3(i)$ as the transmitted power control command $\delta_{PUCCH1}(i)$ of the physical uplink control channel PDCCH1 on a subframe i, that is $$\delta_{PUCCH1}(i) = (\delta_{PUCCH}^1(i) + \delta_{PUCCH}^2(i) + \delta_{PUCCH}^3(i))/3$$

The user equipment takes an average value of $\delta_{PUCCH}^4(i)$, $\delta_{PUCCH}^5(i)$ as the transmitted power control command $\delta_{PUCCH2}(i)$ of the physical uplink control channel PDCCH2 on the subframe i, that is $$\delta_{PUCCH2}(i) = (\delta_{PUCCH}^4(i) + \delta_{PUCCH}^5(i))/2$$

Thus, sums of transmitted power control commands of the physical uplink control channels PDCCH1 and PDCCH2 on the subframes $i-k_0, i-l_1, \ldots, i-k_{M-1}$ are respectively:

$$\sum_{m=0}^{M-1} \delta_{PUCCH1}(i-k_m) =$$

$$\frac{1}{3}\sum_{m=0}^{M-1} \{\delta_{PUCCH}^1(i-k_m) + \delta_{PUCCH}^2(i-k_m) + \delta_{PUCCH}^3(i-k_m)\}$$

$$\sum_{m=0}^{M-1} \delta_{PUCCH2}(i-k_m) = \frac{1}{2}\sum_{m=0}^{M-1} \{\delta_{PUCCH}^4(i-k_m) + \delta_{PUCCH}^5(i-k_m)\}$$

wherein, values of M and $k_m$ are related to uplink and downlink configurations of the system.

When the physical uplink control channels PUCCH1 and PUCCH2 are sent, the user equipment UE1 determines to use the accumulated value power control for the physical uplink control channel according to an Accumulation-enabled power control parameter configured by an upper level signaling.

Current power control adjustment states $g_1(i)$ and $g_2(i)$ of the PUCCH1 and PUCCH2 are respectively:

$$g_1(i) = g_1(i-1) + \sum_{m=0}^{M-1} \delta_{PUCCH1}(i-k_m)$$

$$g_2(i) = g_2(i-1) + \sum_{m=0}^{M-1} \delta_{PUCCH2}(i-k_m)$$

wherein, values of M and $k_m$ are related to uplink and downlink configurations of the system. $g_1(i-1)$ and $g_2(i-1)$ are power control adjustment states of the PUCCH1 and PUCCH2 respectively on a subframe i−1, and $\delta_{PUCCH1}(i-k_m)$ and $\delta_{PUCCH2}(i-k_m)$ are transmitted power control commands of the physical uplink control channels PUCCH1 and PUCCH2 respectively on a subframe $i-k_m$.

EXAMPLE 6

It is assumed that one LTE-A system works in a time division duplex mode, and the LTE-A system has five component carriers C1, C2, C3, C4 and C5.

Currently, a base station sends physical downlink shared channels PDSCH1, PDSCH2, PDSCH3, PDSCH4 and PDSCH5 to a user equipment UE1 over five downlink component carriers C1, C2, C3, C4 and C5, and the user equipment UE1 will send response information ACK/NACK of the PDSCH1, PDSCH2, PDSCH3, PDSCH4 and PDSCH5 over the U1 through two physical uplink control channels PDCCH1 and PDCCH2 respectively. The base station indicates multiple transmitted power control commands for the physical uplink control channels PDCCH1 and PDCCH2.

The base station transmits four transmitted power control commands of $\delta_{PUCCH}^1(i)$, $\delta_{PUCCH}^2(i)$, $\delta_{PUCCH}^3(i)$, $\delta_{PUCCH}^4(i)$ used for the physical uplink control channel in four downlink control information formats which are sent to the user equipment UE1 and used to schedule the physical downlink shared channels PDSCH1, PDSCH2, PDSCH3 and PDSCH4; and the base station sends one transmitted power control command $\delta_{PUCCH}(i)$ used for the physical uplink control channel in Downlink Control Information (DCI) format 3/3A encoded jointly by multiple transmitted power control commands.

The user equipment accumulates five transmitted power control commands on the subframes $i-k_0, i-k_1, \ldots, i-k_{M-1}$ respectively:

$$\sum_{m=0}^{M-1}\delta^1_{PUCCH}(i-k_m),\ \sum_{m=0}^{M-1}\delta^2_{PUCCH}(i-k_m),\ \sum_{m=0}^{M-1}\delta^3_{PUCCH}(i-k_m),$$

$$\sum_{m=0}^{M-1}\delta^4_{PUCCH}(i-k_m),\ \sum_{m=0}^{M-1}\delta^5_{PUCCH}(i-k_m)$$

wherein, values of M and $k_m$ are related to uplink and downlink configurations of the system.

Then, a minimum value in $$\sum_{m=0}^{M-1}\delta^1_{PUCCH}(i-k_m),\ \sum_{m=0}^{M-1}\delta^2_{PUCCH}(i-k_m),\ \sum_{m=0}^{M-1}\delta^3_{PUCCH}(i-k_m)$$

is taken as a sum of transmitted power control commands of the physical uplink control channel PUCCH1 on the subframes $i-k_0, i-k_1, \ldots, i-k_{M-1}$, that is $$\sum_{m=0}^{M-1}\delta_{PUCCH1}(i-k_m) = \min\left\{\begin{array}{l}\sum_{m=0}^{M-1}\delta^1_{PUCCH}(i-k_m),\\ \sum_{m=0}^{M-1}\delta^2_{PUCCH}(i-k_m),\\ \sum_{m=0}^{M-1}\delta^3_{PUCCH}(i-k_m)\end{array}\right\}$$

a minimum value in $$\sum_{m=0}^{M-1}\delta^4_{PUCCH}(i-k_m),\ \sum_{m=0}^{M-1}\delta^5_{PUCCH}(i-k_m)$$

is taken as a sum of transmitted power control commands of the physical uplink control channel PDCCH2 on the subframes $i-k_0, i-k_1, \ldots, i-k_{M-1}$, that is $$\sum_{m=0}^{M-1}\delta_{PUCCH2}(i-k_m) = \min\left\{\sum_{m=0}^{M-1}\delta^4_{PUCCH}(i-k_m),\ \sum_{m=0}^{M-1}\delta^5_{PUCCH}(i-k_m)\right\}$$

Or, if a resource index of the PUCCH1 is mapped implicitly by a CCE index of the physical downlink control channel which schedules the physical downlink shared channel PDSCH3 on the component carrier C3, thus $$\sum_{m=0}^{M-1}\delta_{PUCCH1}(i-k_m) = \sum_{m=0}^{M-1}\delta^3_{PUCCH}(i-k_m)$$

if a resource index of the PUCCH2 is mapped implicitly by the CCE index of the physical downlink control channel which schedules the physical downlink shared channel PDSCH5 on the component carrier C5, thus $$\sum_{m=0}^{M-1}\delta_{PUCCH2}(i-k_m) = \sum_{m=0}^{M-1}\delta^5_{PUCCH}(i-k_m)$$

When the physical uplink control channels PUCCH1 and PUCCH2 are sent, the user equipment UE1 determines to use the absolute value power control for the physical uplink control channel according to an accumulation-enabled power control parameter configured by an upper level signaling.

Current power control adjustment states g(i) of the PUCCH1 and PUCCH2 are $$g_1(i) = \sum_{m=0}^{M-1}\delta_{PUCCH1}(i-k_m)$$

$$g_2(i) = \sum_{m=0}^{M-1}\delta_{PUCCH2}(i-k_m)$$

wherein, values of M and $k_m$ are related to uplink and downlink configurations of the system.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

The above description is only the examples of the present invention, which is not used to limit the present invention. The present invention can have various modifications and changes for the skilled in the art. All the modifications, equivalent substitutions, and improvements, etc. made within the spirit and principle of the present invention shall fall into the scope of the claims of the present invention.

INDUSTRIAL APPLICABILITY

With the present invention, in the LTE-A system adopting the carrier aggregation, when response information ACK/NACK of Physical Downlink Shared Channels (PDSCH) on multiple component carriers is sent on one Physical Uplink Control Channel (PUCCH), the problem that how a user equipment determines a current power control adjustment state of the PUCCH and then determines transmitted power of the PUCCH according to the transmitted power control commands indicated by the base station is solved.

What is claimed is:

1. A power control method for a Physical Uplink Control Channel, comprising:
when response information of multiple Physical Downlink Shared Channels (PDSCH) sent by a base station over multiple component carriers is sent on one Physical Uplink Control Channel (PUCCH), the base station indicating a unified transmitted power control command for the Physical Uplink Control Channel; or, the base station indicating multiple transmitted power control commands for the Physical Uplink Control Channel;

wherein:
the base station sends a power control adjustment state g(i) of the PUCCH on a subframe i;
the power control adjustment state g(i) is an absolute value transmitted power control:

$$g(i) = \sum_{m=0}^{M-1} \delta_{PUCCH}(i - k_m)$$

or the power control adjustment state g(i) is an accumulated value power control:

$$g(i) = g(i-1) + \sum_{m=0}^{M-1} \delta_{PUCCH}(i - k_m)$$

wherein, g(i−1) is the power control adjustment state of the PUCCH on a subframe i−1, M and $k_m$ are related to configurations of a system, and $$\sum_{m=0}^{M-1} \delta_{PUCCH}(i - k_m)$$

is a sum of the transmitted power control commands indicated by the base station on subframes $i-k_0$, $i-k_1$, ..., $i-k_{M-1}$.

2. The method according to claim 1, wherein:
the transmitted power control command is transmitted in downlink control information borne by a Physical Downlink Control Channel (PDCCH); wherein,
the downlink control information is a downlink control information format encoded jointly by multiple transmitted power control commands; or, the downlink control information is a downlink control information format/downlink control information formats used to schedule one or more PDSCHs in the multiple PDSCHs.

3. The method according to claim 1, wherein, when the system is a frequency division duplex system, then M=1, $k_0$=4 and the $$\sum_{m=0}^{M-1} \delta_{PUCCH}(i - k_m) = \delta_{PUCCH}(i - 4).$$

4. The method according to claim 1, wherein, when the system is a time division duplex system, values of M and $k_m$ are related to uplink and downlink configurations of the time division duplex system.

5. The method according to claim 1, wherein, when the base station indicates the unified transmitted power control command for the physical uplink control channel, the method further comprises:
if a user equipment detects one or more downlink control information formats used to schedule multiple physical downlink shared channels on the multiple component carriers on the subframe i, the user equipment taking the transmitted power control commands contained in the one or more downlink control information formats as the transmitted power control command $\delta_{PUCCH}(i)$ of the physical uplink control channel indicated by the base station on the subframe i;

if the user equipment detects the downlink control information format encoded jointly by multiple transmitted power control commands on the subframe i, the user equipment taking corresponding transmitted power control commands contained in the downlink control information format encoded jointly by the multiple transmitted power control commands as the transmitted power control command $\delta_{PUCCH}(i)$ of the physical uplink control channel indicated by the base station on the subframe i; and if the user equipment does not detect one or more downlink control information formats used to schedule multiple physical downlink shared channels on the multiple component carriers on the subframe i, and if the user equipment does not detect the downlink control information format encoded jointly by the multiple transmitted power control commands on the subframe i, then $\delta_{PUCCH}(i)$=0 dB.

6. The method according to claim 1 wherein, the method further comprises:
the user equipment determining to use the accumulated value power control or absolute value power control for the physical uplink control channel according to parameters configured by an upper level signaling.

7. The method according to claim 2, wherein:
when the downlink control information is the downlink control information format encoded jointly by multiple transmitted power control commands, the method further comprises: the base station configuring a transmitted power control index for the PUCCH, which is used to indicate a position of the transmitted power control command in the downlink control information format encoded jointly by the multiple transmitted power control commands.

8. The method according to claim 2, wherein:
when the downlink control information is the downlink control information format encoded jointly by multiple transmitted power control commands, the method further comprises: sending the physical downlink control channel bearing the downlink control information format encoded jointly by the multiple transmitted power control commands over a user equipment-specific component carrier; wherein, the specific component carrier comprises: a component carrier sending the physical uplink control channel, or a downlink component carrier paired with an uplink component carrier sending the physical uplink control channel, or an anchor component carrier of the user equipment.

9. The method according to claim 3, wherein:
when the base station indicates multiple transmitted power control commands for the physical uplink control channel:
the $\delta_{PUCCH}(i-4)=\text{func}\{\delta_{PUCCH}^{c1}(i-4), \ldots, \delta_{PUCCH}^{cj}(i-4), \ldots, \delta_{PUCCH}^{cN}(i-4)\}$ or, if a resource index of the physical uplink control channel bearing the response information of N physical downlink shared channels is mapped implicitly by a Control Channel Element (CCE) index of the physical downlink control channel which schedules the physical downlink shared channel on a component carrier $c_h$, thus $\delta_{PUCCH}(i-4)=\delta_{PUCCH}^{ch}(i-4)$ wherein, func{•} represents one function; N is a number of PDSCHs transmitting the response information of the PDSCH on the PUCCH; and $\delta_{PUCCH}^{cj}(i-4)$ is as follows:

if the user equipment detects the downlink control information format used to schedule the physical downlink shared channel on the component carrier $c_j$ on a subframe i−4, the user equipment taking the transmitted power control commands contained in the downlink control information format as the $\delta_{PUCCH}{}^{cj}$(i−4), wherein, the component carrier $c_j$ is one of the multiple component carriers;

if the user equipment detects the downlink control information format encoded jointly by multiple transmitted power control commands on the subframe i−4, the user equipment taking the transmitted power control commands of the physical uplink control channel which bears the response information of the physical downlink shared channel on the component carrier $c_j$ contained in the downlink control information format as the $\delta_{PUCCH}{}^{cj}$(i−4); and if the user equipment does not detect the downlink control information format used to schedule the physical downlink shared channel on the component carrier $c_j$ on the subframe i−4, and if the user equipment does not detect the downlink control information format encoded jointly by the multiple transmitted power control commands on the subframe i−4, then $\delta_{PUCCH}{}^{cj}$(i−4)=0 dB.

10. The method according to claim 4, wherein, when the base station indicates multiple transmitted power control commands for the physical uplink control channel:
then the $$\sum_{m=0}^{M-1} \delta_{PUCCH}(i-k_m) =$$

$$\sum_{m=0}^{M-1} func\{\delta_{PUCCH}^{c_1}(i-k_m), \ldots, \delta_{PUCCH}^{c_j}(i-k_m), \ldots, \delta_{PUCCH}^{c_N}(i-k_m)\}$$

or, $$\sum_{m=0}^{M-1} \delta_{PUCCH}(i-k_m) = func\left\{\sum_{m=0}^{M-1} \delta_{PUCCH}^{c_1}(i-k_m), \ldots, \sum_{m=0}^{M-1} \delta_{PUCCH}^{c_j}(i-k_m), \ldots, \sum_{m=0}^{M-1} \delta_{PUCCH}^{c_N}(i-k_m)\right\}$$

or, if the resource index of the physical uplink control channel bearing the response information of N physical downlink shared channels is mapped implicitly by the CCE index of the physical downlink control channel which schedules the physical downlink shared channel on the component carrier $c_h$, thus $$\sum_{m=0}^{M-1} \delta_{PUCCH}(i-k_m) = \sum_{m=0}^{M-1} \delta_{PUCCH}^{c_h}(i-k_m)$$

wherein, func{•} represents one function, and $\delta_{PUCCH}{}^{cj}$(i−$k_m$) is as follows:

if the user equipment detects the downlink control information format used to schedule the physical downlink shared channel on the component carrier $c_j$ on a subframe i−$k_m$, the user equipment taking the transmitted power control commands contained in the downlink control information format as the $\delta_{PUCCH}{}^{cj}$(i−$k_m$), wherein, the component carrier $c_j$ is one of the multiple component carriers;

if the user equipment detects the downlink control information format encoded jointly by multiple transmitted power control commands on the subframe i−$k_m$, the user equipment taking the transmitted power control commands of the physical uplink control channel which bears the response information of the physical downlink shared channel on the component carrier $c_j$ contained in the downlink control information format as the $\delta_{PUCCH}{}^{cj}$(i−$k_m$); and if the user equipment does not detect the downlink control information format used to schedule the physical downlink shared channel on the component carrier $c_j$ on the subframe i−$k_m$, and if the user equipment does not detect the downlink control information format encoded jointly by multiple transmitted power control commands on the subframe i−$k_m$ either, then $\delta_{PUCCH}{}^{cj}$(i−$k_m$)=0 dB, wherein, the function func{•} is: taking a minimum value, or a maximum value, or an average value, or a median value, or a sum in {•}.

11. The method according to claim 9, wherein, the function func{•} is: taking a minimum value, or a maximum value, or an average value, or a median value, or a sum in {•}.

12. A user equipment, which is configured to:

when a base station sends response information of multiple Physical Downlink Shared Channels (PDSCH) sent over multiple component carriers on one Physical Uplink Control Channel (PUCCH), receive a unified transmitted power control command or multiple transmitted power control commands indicated by the base station for the PUCCH, and determine a power control adjustment state g(i) of the PUCCH sent on a subframe i as an absolute value power control according to the transmitted power control command:

$$g(i) = \sum_{m=0}^{M-1} \delta_{PUCCH}(i-k_m)$$

or as an accumulated value power control:

$$g(i) = g(i-1) + \sum_{m=0}^{M-1} \delta_{PUCCH}(i-k_m)$$

wherein, g(i−1) is the power control adjustment state, which is the absolute value power control, of the PUCCH sent on a subframe i−1, M and $k_m$ are related to configurations of a system, and $$\sum_{m=0}^{M-1} \delta_{PUCCH}(i-k_m)$$

is a sum of the transmitted power control commands indicated by the base station on subframes i−$k_0$, i−$k_1$, ..., i−$k_{M-1}$.

13. The user equipment according to claim 12, wherein, when the system is a frequency division duplex system, then $M=1$, $k_0=4$ and $$\sum_{m=0}^{M-1} \delta_{PUCCH}(i-k_m) = \delta_{PUCCH}(i-4);$$

when the system is a time division duplex system, values of M and $k_m$ m are related to uplink and downlink configurations of the time division duplex system.

14. The user equipment according to claim 12, wherein, the user equipment is further configured to: when one or more downlink control information formats used to schedule multiple physical downlink shared channels on the multiple component carriers on the subframe i are detected, take the transmitted power control commands contained in the one or more downlink control information formats as the transmitted power control command $\delta_{PUCCH}(i)$ of the physical uplink control channel indicated by the base station on the subframe i;

if a downlink control information format encoded jointly by multiple transmitted power control commands is detected on the subframe i, take corresponding transmitted power control commands contained in the downlink control information format encoded jointly by the multiple transmitted power control commands as the transmitted power control command $\delta_{PUCCH}(i)$ of the physical uplink control channel indicated by the base station on the subframe i; and if a user equipment does not detect one or more downlink control information formats used to schedule multiple physical downlink shared channels on the multiple component carriers on the subframe i, and if the user equipment does not detect the downlink control information format encoded jointly by the multiple transmitted power control commands on the subframe i, then $\delta_{PUCCH}(i)=0$ dB.

15. The user equipment according to claim 12, wherein, the user equipment is further configured to: when the system is a frequency division duplex system, determine the $$\sum_{m=0}^{M-1} \delta_{PUCCH}(i-k_m)$$

according to the following way:

the $\sum_{m=0}^{M-1} \delta_{PUCCH}(i-k_m) = \delta_{PUCCH}(i-4)$, wherein $\delta_{PUCCH}(i-4)=\text{func}\{\delta_{PUCCH}^{c1}(i-4),\ldots,\delta_{PUCCH}^{cj}(i-4),\ldots,\delta_{PUCCH}^{cN}(i-4)\}$ or, if a resource index of the physical uplink control channel bearing the response information of N physical downlink shared channels is mapped implicitly by a Control Channel Element (CCE) index of a physical downlink control channel which schedules the physical downlink shared channel on a component carrier $c_h$, thus $\delta_{PUCCH}(i-4)=\delta_{PUCCH}^{ch}(i-4)$ wherein, func$\{\bullet\}$ represents one function; N is a number of PDSCHs transmitting the response information of the PDSCHs on the PUCCH; and $\delta_{PUCCH}^{cj}(i-4)$ is as follows:

if the user equipment detects the downlink control information format used to schedule the physical downlink shared channel on the component carrier $c_j$ on a subframe i-4, the user equipment taking the transmitted power control commands contained in the downlink control information format as the $\delta_{PUCCH}^{cj}(i-4)$, wherein, the component carrier $c_j$ is one of the multiple component carriers;

if the user equipment detects the downlink control information format encoded jointly by multiple transmitted power control commands on the subframe i-4, the user equipment taking the transmitted power control commands of the physical uplink control channel which bears the response information of the physical downlink shared channel on the component carrier $c_j$ contained in the downlink control information format as the $\delta_{PUCCH}^{cj}(i-4)$; and if the user equipment does not detect the downlink control information format used to schedule the physical downlink shared channel on the component carrier $c_j$ on the subframe i-4, and does not detect the downlink control information format encoded jointly by the multiple transmitted power control commands on the subframe i-4, then $\delta_{PUCCH}^{cj}(i-4)=0$ dB, wherein, the function func$\{\bullet\}$ is: taking a minimum value, or a maximum value, or an average value, or a median value, or a sum in $\{\bullet\}$.

16. The user equipment according to claim 12, wherein, the user equipment is further configured to: in a time division duplex system, determine $$\sum_{m=0}^{M-1} \delta_{PUCCH}(i-k_m)$$

the according to the following way:

$$\sum_{m=0}^{M-1} \delta_{PUCCH}(i-k_m) =$$

$$\sum_{m=0}^{M-1} \text{func}\{\delta_{PUCCH}^{c1}(i-k_m),\ldots,\delta_{PUCCH}^{cj}(i-k_m),\ldots,\delta_{PUCCH}^{cN}(i-k_m)\}$$

or, $$\sum_{m=0}^{M-1} \delta_{PUCCH}(i-k_m) = \text{func}\left\{\sum_{m=0}^{M-1}\delta_{PUCCH}^{c1}(i-k_m),\ldots,\right.$$
$$\left.\sum_{m=0}^{M-1}\delta_{PUCCH}^{cj}(i-k_m),\ldots,\sum_{m=0}^{M-1}\delta_{PUCCH}^{cN}(i-k_m)\right\}$$

or, if the resource index of the physical uplink control channel bearing the response information of N physical downlink shared channels is mapped implicitly by the CCE index of the physical downlink control channel which schedules the physical downlink shared channel on the component carrier $c_h$, thus $$\sum_{m=0}^{M-1} \delta_{PUCCH}(i-k_m) = \sum_{m=0}^{M-1} \delta_{PUCCH}^{c_h}(i-k_m)$$

wherein, func{•} represents one function, and $\delta_{PUCCH}^{c_j}(i-k_m)$ is as follows:

if the user equipment detects the downlink control information format used to schedule the physical downlink shared channel on the component carrier $c_j$ on a subframe $i-k_m$, the user equipment taking the transmitted power control commands contained in the downlink control information format as the $\delta_{PUCCH}^{c_j}(i-k_m)$, wherein, the component carrier $c_j$ is one of the multiple component carriers;

if the user equipment detects the downlink control information format encoded jointly by multiple transmitted power control commands on the subframe $i-k_m$, the user equipment taking the transmitted power control commands of the physical uplink control channel which bears the response information of the physical downlink shared channel on the component carrier $c_j$ contained in the downlink control information format as the $\delta_{PUCCH}^{c_j}(i-k_m)$; and if the user equipment does not detect the downlink control information format used to schedule the physical downlink shared channel on the component carrier $c_j$ on the subframe $i-k_m$, and does not detect the downlink control information format encoded jointly by multiple transmitted power control commands on the subframe $i-k_m$, then the $\delta_{PUCCH}^{c_j}(i-k_m)=0$ dB, wherein, the function func{•} is: taking a minimum value, or a maximum value, or an average value, or a median value, or a sum in {•}.

17. The user equipment according to claim 12, wherein, the user equipment is further configured to: determine to use the accumulated value power control or absolute value power control for the PUCCH according to an upper level signaling.

* * * * *